US011537666B2

(12) United States Patent
Dugan et al.

(10) Patent No.: US 11,537,666 B2
(45) Date of Patent: Dec. 27, 2022

(54) CROWDSOURCED PREVENTION OR REDUCTION OF DISSEMINATION OF SELECTED CONTENT IN A SOCIAL MEDIA PLATFORM

(71) Applicant: International Business Machines Corporation, Armonk, NY (US)

(72) Inventors: Casey Dugan, Cambridge, MA (US); Werner Geyer, Newton, MA (US); Michael Muller, Medford, MA (US); James Johnson, Somerville, MA (US); Aabhas Sharma, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 283 days.

(21) Appl. No.: 16/260,329

(22) Filed: Jan. 29, 2019

(65) Prior Publication Data

US 2020/0242161 A1    Jul. 30, 2020

(51) Int. Cl.
*G06F 16/906* (2019.01)
*G06F 16/9536* (2019.01)
(Continued)

(52) U.S. Cl.
CPC ......... *G06F 16/906* (2019.01); *G06F 16/907* (2019.01); *G06F 16/9536* (2019.01); *G06N 20/00* (2019.01); *G06Q 50/01* (2013.01)

(58) Field of Classification Search
CPC ...... G06F 16/906; G06Q 30/02; G06Q 10/10; H04L 51/212
See application file for complete search history.

(56) References Cited

U.S. PATENT DOCUMENTS 9,584,989 B2    2/2017  Skudlark et al.
2007/0243517 A1* 10/2007  Olsen ............... G09B 5/065
                                                434/365

(Continued)

FOREIGN PATENT DOCUMENTS

RU            2613530        3/2017
WO     WO-2019222742 A1 * 11/2019  ............ G06F 16/90

OTHER PUBLICATIONS

Ghosh et al., "Who Moderates the Moderators? Crowdsourcing Abuse Detection in User-generated Content," Proceedings of the 12th ACM conference on Electronic commerce, 2011, 12 pages.

(Continued)

*Primary Examiner* — Apu M Mofiz
*Assistant Examiner* — Farhad Agharahimi
(74) *Attorney, Agent, or Firm* — Amin, Turocy & Watson, LLP

(57) ABSTRACT

Crowdsourced solutions are provided that can prevent and/or reduce dissemination of selected digital content in a social media platform. In one embodiment, a system can include at least one memory device having computer-executable components stored therein, and at least one processor configured to execute the computer-executable components. Such computer-executable components can include a selection component that identifies multiple reviewer accounts using a selection criterion corresponding to a user account in the social media platform. The multiple reviewer accounts can evaluate presence of particular digital content in the social media platform directed to the user account. The computer-executable components also can include a routing component that can provide portions of digital content directed to the user account to respective reviewer accounts. The computer-executable components can further include a feedback (Continued)

component that receives rating information indicative of ratings for the portions of the second digital content.

20 Claims, 10 Drawing Sheets

(51) Int. Cl.
  *G06Q 50/00* (2012.01)
  *G06N 20/00* (2019.01)
  *G06F 16/907* (2019.01)

(56) References Cited

U.S. PATENT DOCUMENTS

| | | | | |
|---|---|---|---|---|
| 2007/0250863 | A1* | 10/2007 | Ferguson | H04H 20/106 725/35 |
| 2011/0125844 | A1* | 5/2011 | Collier | H04W 4/38 709/204 |
| 2012/0036147 | A1* | 2/2012 | Borst | H04L 51/212 707/769 |
| 2015/0135285 | A1* | 5/2015 | Boro | H04L 67/34 726/5 |
| 2016/0205141 | A1* | 7/2016 | Erickson | H04L 51/32 726/1 |
| 2016/0294755 | A1* | 10/2016 | Prabhu | H04L 51/046 |
| 2017/0359284 | A1* | 12/2017 | Sudduth | H04L 51/212 |
| 2019/0037038 | A1* | 1/2019 | Ben-Yoseph | H04L 67/75 |
| 2019/0220512 | A1* | 7/2019 | Parikh | G06F 40/205 |

OTHER PUBLICATIONS

Ho et al., "Adaptive Task Assignment for Crowdsourced Classification," Proceedings of the 30th International Conference on Machine Learning, JMLR: W&CP vol. 28, 2013, 9 pages.

Mell, Peter, et al. "The NIST Definition of Cloud Computing." National Institute of Standards and Technology. Sep. 2011. 7 pages.

* cited by examiner

CROWDSOURCED PREVENTION OR REDUCTION OF DISSEMINATION OF SELECTED CONTENT IN A SOCIAL MEDIA PLATFORM

BACKGROUND

The subject disclosure relates to crowdsourced prevention and/or reduction of dissemination of selected digital content to user accounts in a social media platform.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later.

According to an embodiment, a system is provided. The system includes a memory that stores computer-executable components; and a processor, operatively coupled to the memory, that executes computer-executable components. The computer-executable components can include a selection component that identifies multiple reviewer accounts based at least on one or more selection criteria corresponding to a user account in a social media platform. The multiple reviewer accounts evaluate presence of offensive digital content in the social media platform directed to the user account. The computer-executable components also include a content routing component that provides portions of digital content directed to the user account to respective reviewer accounts of the multiple reviewer accounts. The computer-executable components further include a feedback component that receives, from the respective reviewer accounts, rating information indicative of ratings for the portions of the digital content. A first rating of the ratings classifies a first portion of the portions of the digital content as one of offensive content or non-offensive content.

According to another embodiments, a computer-implemented method is provided. The computer-implemented method includes selecting, by a system operatively coupled to a processor, multiple reviewer accounts based at least on one or more selection criteria corresponding to a user account in a social media platform. The multiple reviewer accounts evaluate presence of offensive digital content in the social media platform directed to the user account. The computer-implemented method also includes providing, by the system, portions of digital content directed to the user account to respective reviewer accounts of the multiple reviewer accounts. The computer-implemented method further includes receiving, by the system, from the respective reviewer accounts, rating information indicative of ratings for the portions of the digital content. A first rating of the ratings classifies a first portion of the portions of the digital content as one of offensive content or non-offensive content.

According to yet another embodiment, the disclosure includes a computer program product for providing a crowdsourced solution to remove offensive digital content from a social media user account. The computer program product includes a computer readable storage medium having program instructions embodied therewith. The program instructions are executable by a processor to cause the processor to select multiple reviewer accounts based at least on one or more selection criteria corresponding to a user account in a social media platform. The multiple reviewer accounts evaluate presence of offensive digital content in a social media platform directed to the user account. The program instructions also are executable by the processor to cause the processor to provide portions of digital content directed to the user account to respective reviewer accounts of the multiple reviewer accounts. The program instructions are further executable by the processor to cause the processor to receive from the respective reviewer accounts, rating information indicative of ratings for the portions of the second digital content. A first rating of the ratings classifies a first portion of the portions of the second digital content as one of offensive content or non-offensive content.

DETAILED DESCRIPTION

Figure 1:
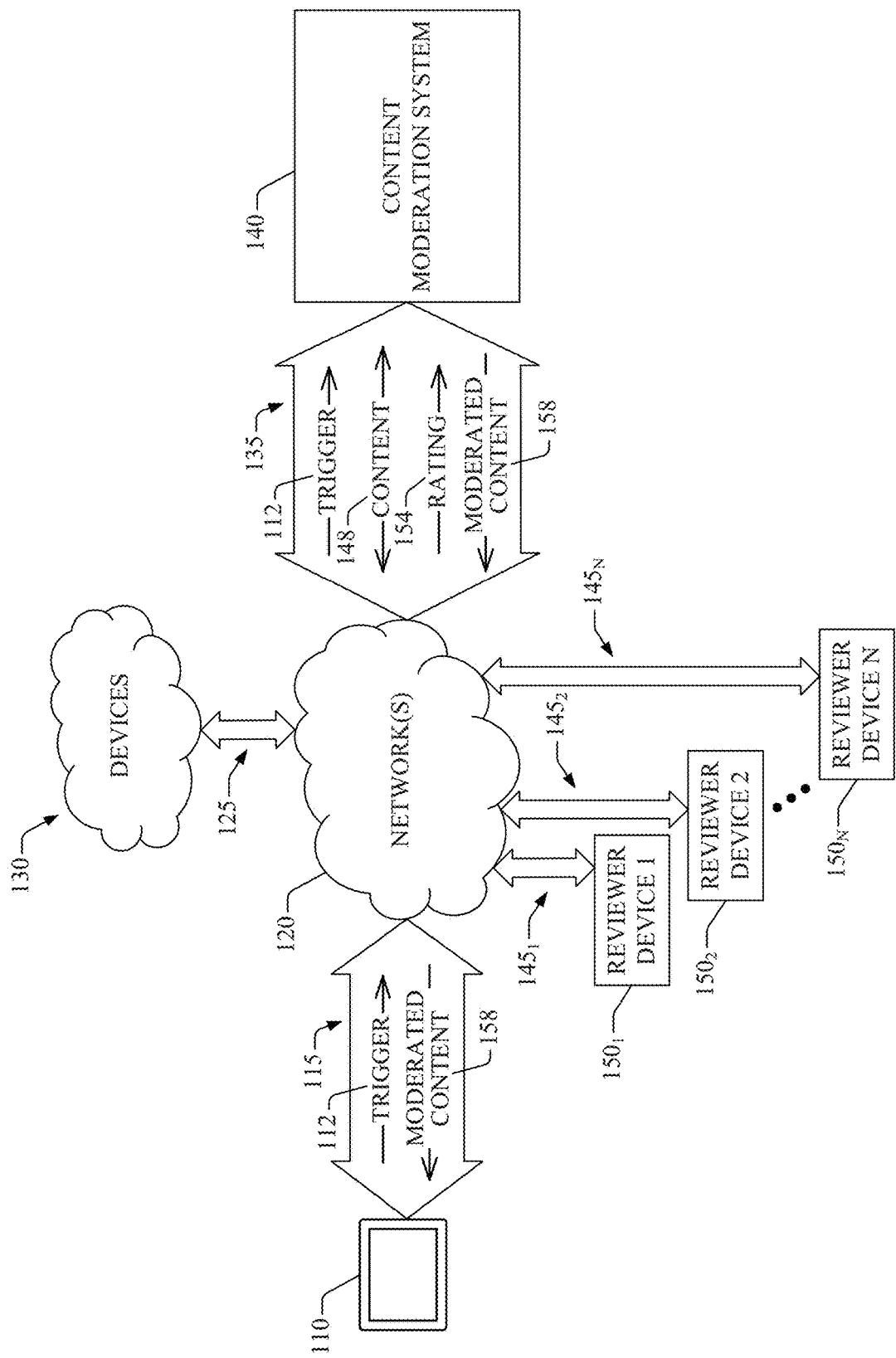
FIG. 1 presents an example, non-limiting embodiment of an operational environment that can prevent the dissemination of offensive digital content directed to a user account in a social media platform in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

At least some embodiments described herein are described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

One or more embodiments recognizes and addresses, in at least some embodiments, the issue of dissemination of offensive and/or undesirable digital content to user accounts in a social media platform. Social media provides a wealth of user-generated online content as publicly-available content can be readily generated and interaction with other users from around the world can be essentially seamless. Yet, such flexibility in the dissemination of user-generated content can result in the proliferation of various types of undesired content. More particularly, some undesirable content can be directed to user accounts as a form of aggression, which is commonly referred to as cyberbullying. As both the number of user accounts and undesired content proliferate, some populations of users appear to be more vulnerable to offensive or otherwise inappropriate content. Not only can undesired content generate attrition in social media platforms, but in extreme situations, such content can result in harm to an intended recipient of the undesirable content. Further, the effect of undesirable content can be greatly amplified as a result of user accounts that generate such content being able to organize a collective, coordinated attack on a particular user account in a social media platform. Accordingly, in some instances, an amount of undesirable content can overwhelm a user account, obfuscating legitimate non-offensive content and potentially resulting in disengagement of the user account from the social media platform.

Therefore, the embodiments provide systems, computer-implemented techniques, and computer-program products that, individually or in combination, permit or otherwise facilitate preventing the dissemination of digital content that can be undesirable to a particular user account within a social media platform. The digital content can include various types of electronic media and/or information that refer or otherwise are directed to the particular user account. For instance, the digital content can include posts on the social media platform that mention (e.g., tag) the user; reply messages to the user account; private messages for the user account; and the like.

More specifically, as is described in greater detail below, embodiments described herein permit or otherwise facilitate a selective form of crowdsourcing that can detect undesirable content directed to the particular user account within the social media platform. The particular user account can be associated with a self-identified at-risk individual and/or an individual who pertains to a defined demographic. Embodiments described herein can apply various types of selection criteria that can permit or otherwise facilitate matching a group of reviewer accounts—the "crowd" or "crowd users," as are referred to herein—to the particular user account. In light of the selection criteria, in some scenarios, the group of reviewer accounts can be trusted by the particular user account to mitigate or even entirely avoid exposure of the user account to undesirable content. Trust can be determined based on numerous concrete factors, including a proven track record of correctly filtering out offensive content; affinity with the particular user account so as to render the reviewer account sensitive to the offensive content; or the like.

Digital content directed to the particular user account can then be routed to at least some of the selected group of reviewer accounts before the content is provided (e.g., sent or made available) to the user account for presentation in a user device associated with the user account. Each reviewer account that receives a portion of the digital content directed to the user account can provide an assessment that classifies or otherwise rates the portion of the digital content as at least one of offensive content or non-offensive content. Embodiments described herein can provide digital content classified as non-offensive content to the user account, for consumption at a user device associated with the user account.

Embodiments described herein can be integrated into a social media platform or can be operatively coupled to the social media platform. It is noted that embodiments described herein are disclosed with reference to social media platforms simply for the sake of illustration. Indeed, the embodiments are not limited in that respect and the principles and practical elements of the disclosure can be applied to other types of electronic forums where digital content can be disseminated peer-to-peer amongst a group of user accounts.

Embodiments described herein can provide several technical improvements and benefits over commonplace approaches for the management of undesirable content in a social media platform. For example, by matching a group of reviewer accounts to a particular user account in the social media platform, some embodiments described herein permit customizing the evaluation of undesirable content in digital content directed to the particular user account. As such, a piece of digital content in a defined forum (e.g., a group) within the social media platform can be rated to be offensive to a first user account but not to a second user account. Commonplace approaches usually lack such specificity, relying mainly on system administrator account to determine if a defined type of content is to be blocked from presentation in a user account.

In yet another example, in contrast to commonplace approaches to management of offensive content, some embodiments described herein can prevent and/or reduce the dissemination of offensive or otherwise undesirable content without reliance on reports or other types of notifications that a specific portion of digital content is deemed to be offensive by a particular user account. Accordingly, one or more embodiment of this disclosure can permit or otherwise facilitate avoiding the allocation of network bandwidth and/or processing resources for such reports and/or notifications. Accordingly, in light of substantial and ever-increasing amount of digital content and user accounts in a social media platform, some embodiments described herein permit efficient operation of a social media platform.

With reference to the drawings, FIG. 1 presents example of an operational environment 100 for crowdsourced prevention and/or reduction of the dissemination of offensive digital content directed to a user account within a social media platform in accordance with one or more embodiments described herein. As mentioned, the social media platform can be embodied in or can include, for example, an electronic forum for the distribution or exchange of electronic media and/or information. For instance, the social media platform can include one of Instagram™, Snapchat™, Facebook™, Twitter™, or LinkedIn™.

The exemplified operational environment 100 includes a user device 110 that can present digital content directed to the user account within the social media platform. As such, the user device 110 can be associated with the specific user account. The user device 110 can be utilized in diverse settings, such as a public library, a school study hall, a senior center, and so forth. As mentioned, such digital content can include various types of electronic media and/or information that refer or otherwise correspond to the user. For instance, the digital content can include posts on the social media platform that mention (e.g., tag) the user; reply messages to the user account; private messages for the user account; and the like. While the user device 110 is generically depicted as a tablet computing device, the embodiments are not limited to such a type of device and the principles and practical elements of this disclosure can be implemented in other types of user devices (mobile or otherwise). Indeed, this disclosure does not require a specific type of device or repeated use of a same device. Accordingly, as an illustration, the user device 110 can be embodied in a smartphone, a smartwatch; a videogame console; a generic communication device (e.g., a laptop or a desktop computer) executing a web browser; or the like.

In instances in which an end user of the user device 110 perceives that undesired digital content is being directed to the particular user account, the user device 110 can facilitate reporting that the particular user account is at risk of inappropriate treatment by another user account in the social media platform. Thus, the user device 110 that is used to access the user account can send a trigger indication 112 of perceived inappropriate conduct directed to the user account. For instance, the user device 110 can send the trigger indication 112 in response to the end user determining that they are currently being bullied on the social media platform or they are otherwise a recipient of digital content that is perceived as undesirable. Specifically, in order to send the trigger indication 112, in one example, the user device 110 can display a selectable visual element (not depicted in FIG. 1) that, in response to being selected, causes the user device to send the trigger indication 112. The trigger indication 112 is linked to the user account, not to the user device 110. Indeed, the trigger indication 112 can be sent from any user device being utilized to access the user account.

In some embodiments, the trigger indication 112 can be sent to a content moderation system 140 to moderate digital content directed to the user account within the social media platform. The digital content can be moderated before the digital content is provided to the user account. Thus, the digital content can be moderated before being presented at the user device 110 or any other user device configured to consume digital content available to the user account. In order to send the trigger indication 112, the user device 110 can be operatively coupled at least one network of a group of networks 120 (labeled network(s) 120 in FIG. 1). The group of networks 120 can include wireline networks and/or wireless networks having respective footprints (e.g., small-cell network, cellular network, local area network, enterprise network, metropolitan area network, wide area network (WAN) (e.g., the Internet), or the like. One or more network interfaces 115 can permit or otherwise facilitate the operative coupling between the user device 110 and the at least one network of the group of networks 120. The network interface(s) 115 can be embodied in or can include several types of network elements, including base station devices; router devices; switch devices; server devices; aggregator devices; bus architectures; wireless link(s); wireline link(s); a combination of the foregoing; or the like.

The user device 110 (or any other user device being used to access the user account) can send the trigger indication 112 via a communication pathway provided by the one or more network interfaces 115, the at least one network of the network(s) 120, and one or more network interfaces 135. As is illustrated in FIG. 1, the one or more communication conduits can operatively couple the content moderation system 140 to the at least one network of the network(s) 120. The one or more network interfaces 135 can be embodied in or can include several types of network elements, including base station devices; router devices; switch devices; server devices; aggregator devices; bus architectures; a combination of the foregoing; or the like.

The content moderation system 140, however, need not receive the trigger indication 112 from the user device 110 or any other user device being used to access the user account. In some embodiments, a device (not depicted in FIG. 1) of devices 130 can receive the trigger indication 112 and can then send the trigger indication 112 to the content moderation system 140. To that end, such a device can receive the trigger indication 112 via a first communication pathway provided by the one or more network interfaces 115, at least one first network of the network(s) 120, and one or more network interfaces 125. The network interfaces 125 can be embodied in or can include several types of network elements, including base station devices; router devices; switch devices; server devices; aggregator devices; bus architectures; a combination of the foregoing; or the like. The devices 130 can embody or otherwise constitute the social media platform. The user account for which digital content is moderated can be configured in at least one of the devices 130.

As is illustrated in FIG. 1, the one or more network interfaces 125 operatively couple the devices 130 to the at least one first network of the network(s) 120. In addition, the device of the devices 130 that receives the trigger indication 112 can send the trigger indication 112 to the content moderation system 140 via a second communication pathway provided by the one or more network interfaces 125, at least one second network of the network(s) 120, and the one or more network interfaces 135.

Regardless the communication pathway by which the trigger indication 112 is received, in response to the receiving the trigger indication 112 of perceived inappropriate conduct directed to the particular user account in the social media platform, the content moderation system 140 can select multiple reviewer accounts to evaluate presence of offensive digital content within digital content directed to the user account. The multiple reviewer accounts can be selected based at least on one or more selection criteria corresponding to the particular user account in a social media platform. In some embodiments, one or more of the selected reviewer accounts can be configured in at least one of the devices 130. The multiple reviewer accounts can be external to the social media platform in that the reviewer accounts need not be part of the administration of the social media platform. Thus, crowdsource the identification of offensive content. For the sake of nomenclature, as mentioned, the reviewer accounts can be referred to as "crowd users."

Figure 2:
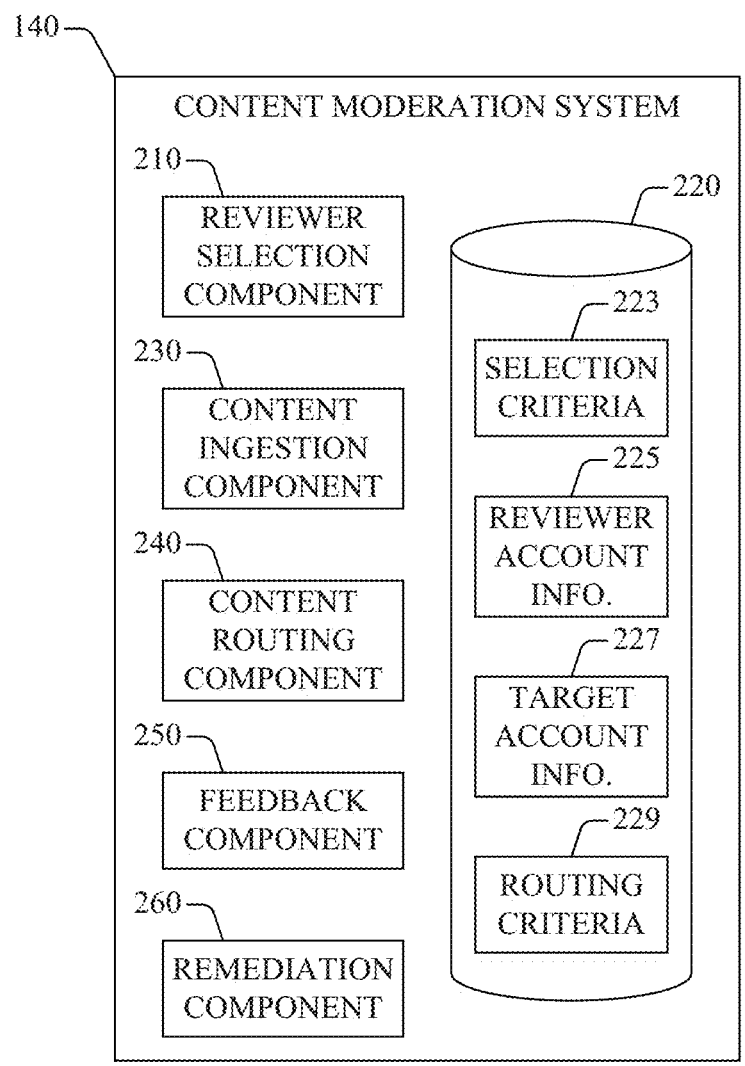
FIG. 2 presents an example, non-limiting embodiment of a system that can prevent the dissemination of offensive digital content directed to a user account in a social media platform in accordance with one or more embodiments described herein.

More specifically, in some embodiments, as is illustrated in FIG. 2, the content moderation system 140 can include a reviewer selection component 210 that can receive the trigger indication 112 of perceived inappropriate conduct directed to a user account in the social media platform. In response to (e.g., upon or after) receiving the trigger indication 112, the reviewer selection component 210 can select the multiple reviewer accounts to identify offensive digital content in the social media platform directed to the user account.

The content moderation system 140 can select, via the reviewer selection component 210 in FIG. 2, for example, the multiple reviewer accounts by applying one or more selection criteria to an extant pool of reviewer accounts. In some embodiments, the extant pool of reviewer accounts can be provisioned by a device of the devices 130, for example, in response to provisioning the user account associated with the trigger indication 112. In other embodiments, the extant pool of reviewer accounts can be generated based on historical information, such as prior explicit selection by the user account. In any instance, the one or more selection criteria can include, for example, a defined type of relationship (e.g., academic, professional, etc.) to the user account; a defined reviewer rating; presence of a defined type of professional certification (e.g., licensed psychologist); membership in an advocacy group (e.g., volunteer member or for-profit member); a combination thereof; or the like. As is illustrated in FIG. 2, the one or more selection criteria can be retained in one or more memory devices, within one or more memory elements (referred to as selection criteria 223). In addition, information (e.g., data and/or metadata) indicative or otherwise representative of the multiple reviewer accounts also can be retained in the one or more memory devices 220, within one or more memory element (referred to as reviewer account information 225).

In one embodiment, the one or more selection criteria can include a defined performance criterion to correctly identify offensive content, and the content moderation system 140 can select each a reviewer account that satisfies such a criterion. In addition, or in another embodiment, the one or more selection criteria can include presence of an established relationship to the user account, such as a first-degree connection on the social media platform (e.g., Instagram™, Facebook™, Twitter™, LinkedIn™, or another type of social media platform). Thus, the content moderation system 140, can identify, via the reviewer selection component 210 in FIG. 2, for example, a reviewer account having an extant relationship with the user account in the social media platform. Further, or yet another embodiment, the one or more selection criteria can include membership in a group of volunteers to review digital content that can be present in a situation corresponding to a defined type of offensive conduct (e.g., school bullying, workplace hostilities, domestic altercations, political altercations, or the like). Accordingly, the content moderation system 140, can identify, via the reviewer selection component 210 in FIG. 2, for example, a volunteer account configured to review digital content present in a situation corresponding to the defined type of offensive conduct.

With further reference to FIG. 1, in some embodiments, the user account that is being access by means of the user device 110 can provide reviewer accounts to evaluate presence of offensive content within digital content in the social media platform directed to the user account associated with the user device 110. To the end, in one example, the user device 110 (or any other user device being utilized to access the user account) can present selectable visual elements indicative of respective reviewer accounts (not depicted in FIG. 1) available for evaluation of presence of offensive content. In some instances, the user device 110 can receive input information indicative of a selection of reviewer accounts and can send selection information indicative of the selected reviewer accounts selected. Thus, in those instances, the user account is configured to identify or otherwise provide the selected reviewer accounts as suitable crowd users.

Further in response to receiving the trigger indication 112, the content moderation system 140 can monitor digital content directed to the user account. The digital content can be monitored before presentation at the user device 110 or any other user device utilized to access the user account. Thus, potentially undesirable portions of the digital content can be identified proactively, prior to consumption at the user device 110 or any other user device. The digital content can be monitored according to numerous approaches. For example, in some embodiments, in response to the receiving the trigger indication 112, the content moderation system 140 can subscribe to a service to receive the digital content. The service can be provided by a device of the devices 130. Such a device can include an agent component that can poll a content server device of the devices 130 in order to collect digital content corresponding to the user account. The device can send the collected digital content to the content moderation system 140. To that end, the trigger indication 112 can include identification (ID) information that identifies the user account (e.g., a handle, a username, or the like). The content moderation system 140 can send the ID information to the agent component. As is illustrated in FIG. 2, the ID information can be retained in one or more memory elements (referred to as target account information 227).

As another example, in other embodiments, the content moderation system 140 can cause or otherwise direct the content server device to send the digital content directed to the user account. To that end, in some implementations, the content moderation system 140 can utilize or otherwise leverage an application programming interface (API) to interface with the content server device.

Regardless the manner of monitoring the digital content directed to a defined user account within the social media platform, the content moderation system 140 can collect or otherwise receive such digital content from at least one of the devices 130. For instance, an edge server device within a content distribution network (CDN) included in the devices 130 can provide the digital content. The collected digital content is labeled as content 148 in FIG. 1. As is illustrated in FIG. 2, in some embodiments, the content moderation system 140 can include a content ingestion component 230 that can monitor the digital content directed to a user account, in accordance with aspects described herein. Accordingly, the content ingestion component 230 can collect or otherwise receive such digital content (e.g., content 148, in FIG. 1).

With further reference to FIG. 1, the content moderation system 140 can provide (e.g., send and/or make available) portions of the collected digital content 148 that is directed to a defined user account within the social media platform. Such portions can be provided to respective reviewer accounts selected in accordance with aspects described herein. As is illustrated in FIG. 1, those portions of the collected digital content 148 can access, from the respective user accounts, by the respective user devices. A user device that accesses a portion of content for moderation can be referred to as a reviewer device. Accordingly, for N reviewer accounts there can be up to N reviewer devices: a first reviewer device $150_1$, a second reviewer device $150_2$, and so forth up to an N-th reviewer device $150_N$. While N is illustrated as being greater than two, the embodiments are not limited in that respect and, in some instances, two reviewer devices can be utilized to evaluate digital content for presence of undesirable digital content.

The content moderation system 140 can apply one or more routing criteria to provide the portions of the collected digital content 148 that is directed to the defined user account within the social media platform. As is illustrated in FIG. 2, the one or more routing criteria can be retained in the one or more memory devices 220, within one or more memory elements (referred to as routing criteria 229).

The routing criteria can include, for example, a rule that dictates that collected digital content 148 be distributed evenly amongst the selected reviewer accounts. As such, each one of the portions of the digital content 148 that are provided to respective reviewer accounts includes a same amount of the collected digital content 148. For instance, each one of such portions can include a same defined number of social media posts and/or a same defined number of private messages.

In addition, or in another example, the routing criteria can include a rule that causes the content moderation system 140 to determine a satisfactory reviewer account to moderate the collected digital content 148. The content moderation system 140 can then provide, for example, the entirety of the collected digital content to the satisfactory reviewer account. Such content can be accessed with any one of the reviewer devices $150_1$-$150_N$ shown FIG. 1.

The satisfactory reviewer account can be considered, in some instances, the most effective at shielding a particular user account from undesirable content. The satisfactory reviewer account can be determined based at least on inter-reviewer reliability amongst selected reviewer accounts. In other words, the satisfactory reviewer account can have a defined review reliability relative to other reviewer accounts. For example, the satisfactory reviewer account can match or exceed a reliability threshold. In some embodiments, the reliability threshold can be quantitative. Specifically, the reliability threshold can be determined based on historical data indicative of performance of evaluation of digital content for presence of undesirable digital content. For instance, the reliability threshold can correspond to a defined rate of consensus between a reviewer account and second reviewer accounts regarding presence of undesirable content within specific digital content. Reliability thresholds based on historical data can be determined by the content moderation system 140 or by another computing system. In other embodiments, a reliability threshold can correspond to a defined relationship between the user account and the reviewer account that is expected to yield one of a best suited reviewer account (e.g., a parent of an end user corresponding to the user account); a second-best suited reviewer account (e.g., a teacher or a coach of the end user); and so forth.

Further, or in other examples, the routing criteria can include a rule that causes the content moderation system 140 to select specific type of digital content within the collected content 148 that is directed to a particular user account within the social media platform. For instance, the specific digital content that is selected can include posts or messages that are highly likely to be offensive as determined using defined evaluation processes, such as creating or, in some embodiments, discovering a dictionary of defined keywords and/or key phrases (such as n-grams or any other types of natural speech). As such, the content moderation system 140 can scan the collected content 148 for such keywords and/or key phrases and can select one or more portions that contain one or more undesirable keywords and/or key phrases.

At least some of the reviewer accounts can provide, to the content moderation system 140, rating information 154 indicative of ratings for portions of the digital content 148. In some instances, one or more of the reviewer devices $150_1$-$150_N$ can be utilized to access a reviewer account and input the rating information. Such a reviewer account can provide the inputted rating information to the content moderation system 140

Each one (or, in some embodiments, at least one) of the ratings can classify respective portions of the digital content 148 as one of offensive content or non-offensive content. In other words, a first rating of the ratings can classify a first portion of the portions of the digital content 148 as one of offensive content or non-offensive content, and a second rating of the ratings can classify a second portion of the portions of the digital content 148 as one of offensive content or non-offensive content. The ratings are specific to the user account to which the digital content 148 is directed to. As such, the classifications provided by respective rating ratings represent an a priori evaluation of whether an end-user that consumes the digital content 148 through the user account can perceive one or more portions of the digital content 148 as being undesirable. It is noted that other types of classification beyond binary classification can be implemented in some embodiments. For example, a portion of digital content can be classified as one of non-offensive, offensive content, or unlawful content.

The content moderation system 140 can receive the rating information 154. As is illustrated in FIG. 2, in some embodiments, the content moderation system 140 can include a feedback component 250 that can receive the rating information 154. In response to receiving the rating information 154, the content moderation system 140 can determine, via the feedback component 250, for example, that a portion of the digital content 148 is classified as non-offensive content. Based at least on such a determination, the content moderation system 140 can provide the portion of the digital content 148 to the user account that is the intended recipient of the digital content 148. Such a portion can be contained within moderated digital content 158 that can be sent or otherwise can be made available to the user account, via the content routing component 240. The moderated digital content 158 can be sent to the user device 110 or any other device being utilized to access the user account via a communication pathway provided by at least one network of the network(s) 120, and the network interface(s) 115. See FIG. 1.

Therefore, in contrast to commonplace approaches to management of offensive content, the content moderation system 140 can prevent and/or reduce the dissemination of undesirable content proactively, without exposing a user account to undesirable content. Further, the content moderation system 140 can prevent and/or reduce the dissemination of the undesirable content without reliance on reports or other types of notifications that a specific portion of the digital content 148 is deemed to be offensive by the user account. Accordingly, the operational environment 100 can avoid allocating bandwidth and/or processing resources for such reports and/or notifications. Thus, in light of substantial and ever-increasing amount of digital content and user accounts in a social media platform, the operational environment 100 can operate more efficiently that conventional social media platforms.

In some scenarios, in response to receiving the rating information 154, the content moderation system 140 can determine, via the feedback component 250, for example, that a portion of the evaluated portions of the digital content 148 is classified as offensive content. Consequently, based at least on such a determination, the content moderation system 140 can implement an exception handling process to resolve the presence of said portion of digital content in the social media platform. In some embodiments, as is illustrated in FIG. 2, the content moderation system 140 can include a remediation component 260 that can implement (e.g., perform or otherwise execute) the exception handling process. In one example, the implementation of the exception handling process can preclude the transmission, to a user account, of the portion of the digital content 148 that includes content that has been classified as undesirable for the user account to which the digital content 148 is directed. Thus, in one aspect, the implementation of the exception handling can proactively prevent and/or reduce the consumption of the undesirable content through the user account. Therefore, again in contrast to commonplace approaches, the content moderation system 140 can proactively exclude digital content that can be undesirable to a user account in the social media platform, without reliance of reports of notifications that the user account deems a piece of the digital content 148 to be undesirable.

As mentioned, excluding such content from a user account in a social media platform can avoid exposure to undesirable content through the user account. In some instances, however, context in a thread of digital content can be lost as a result of the exclusion of the undesired content. For instance, the thread of digital content can be related to a specific topic and can include a chain of comments and/or replies to a post originated by the user account. Removal of some of the comments and/or replies can result in loss of context in the thread. Accordingly, implementation of an exception handling process in accordance with this disclosure can resolve the presence of undesirable content in another fashion besides blocking such content. Specifically, in some embodiments, the implementation of the exception handling process can cause the content moderation system 140 to direct at least one of the reviewer devices $150_1$-$150_N$ to display a selectable visual element (not depicted in FIG. 1) that permits or otherwise facilitates editing the portion of the digital content 148 that has been classified as offensive content. Again, in some embodiments, as is illustrated in FIG. 2, the remediation component 260 that can implement the exception handling process.

The editing can include, for example, removing offensive terminology from the portion of the digital content 148 that has been classified as offensive content while maintaining context within a thread of content. By causing a reviewer device associated with a reviewer account to present selectable visual elements that permit editing digital content directed to a defined user account, a crowd user can rephrase offensive messages to convey the context to the user while remaining harmless.

In some embodiments, to permit or otherwise facilitate maintaining context, the implementation of the exception handling process can result in a summary of context lost in response to the exclusion of one or more portions of the digital content 148 that is classified as offensive content. In one of such embodiments, the remediation component 260 shown in FIG. 2 can generate the summary. The content moderation system 140 can send the summary to each one (or, in some instances, at least one) of the reviewer accounts that evaluate undesirable content within the digital content 148. The summary can serve as a recommendation of context to be preserved while editing such portion(s).

In addition, or in other embodiments, the implementation of an exception handling process by the content moderation system 140 can cause a portion of the digital content 148 that is classified as offensive content to be removed or otherwise rendered unavailable from public view in the social media platform. Such content can be removed temporarily or permanently from public view. In some situations, the portion of the digital content that is classified as offensive content need not be removed from public view. Instead, such a portion of content can be rendered unavailable solely to the user account to which the digital content 148 is directed. In this fashion, the content moderation system 140 can be used to shield the user account from portions of content made available without malicious intent. For instance, an end-user linked to the user account may be phobic to octopi. Thus, by implementing the exception handling process above, the content moderation system 140 can shield the user account from content that includes images of octopi. More broadly, the content moderation system 140 can shield the user account from content, such as images or messages, that are associated with a particular trigger warning.

Further, or in yet other embodiments, the implementation of the exception handling process can cause the content moderation system 140 to report the portion of the digital content 148 that has been classified as offensive content to an administrator device of the social media platform. For instance, the administrator device can be embodied in or can include one of the devices 130. As mentioned, in some embodiments, the remediation component 260, can implement the exception handling process. More specifically, in one implementation, the remediation component 260 can send a notification message to the administrator device, where the notification message identifies the user account that originated the portion of the digital content 148 that has been classified as offensive content.

In addition, or as an alternative, the implementation of the exception handling process can cause the content moderation system 140 to provide (e.g., send or make available) sensitivity training content to the user account that originated the portion of the digital content 148 that has been classified as offensive content. For example, the sensitivity training content can be based at least on edited versions of the original content classified as offensive content (e.g., versions received from one or more of the reviewer accounts that evaluate the digital content 148 for undesirable content). As another example, the sensitivity training content can include statements that can be less offensive and/or can avoid bullying the user account to which the digital content 148 is directed to.

Figure 3:
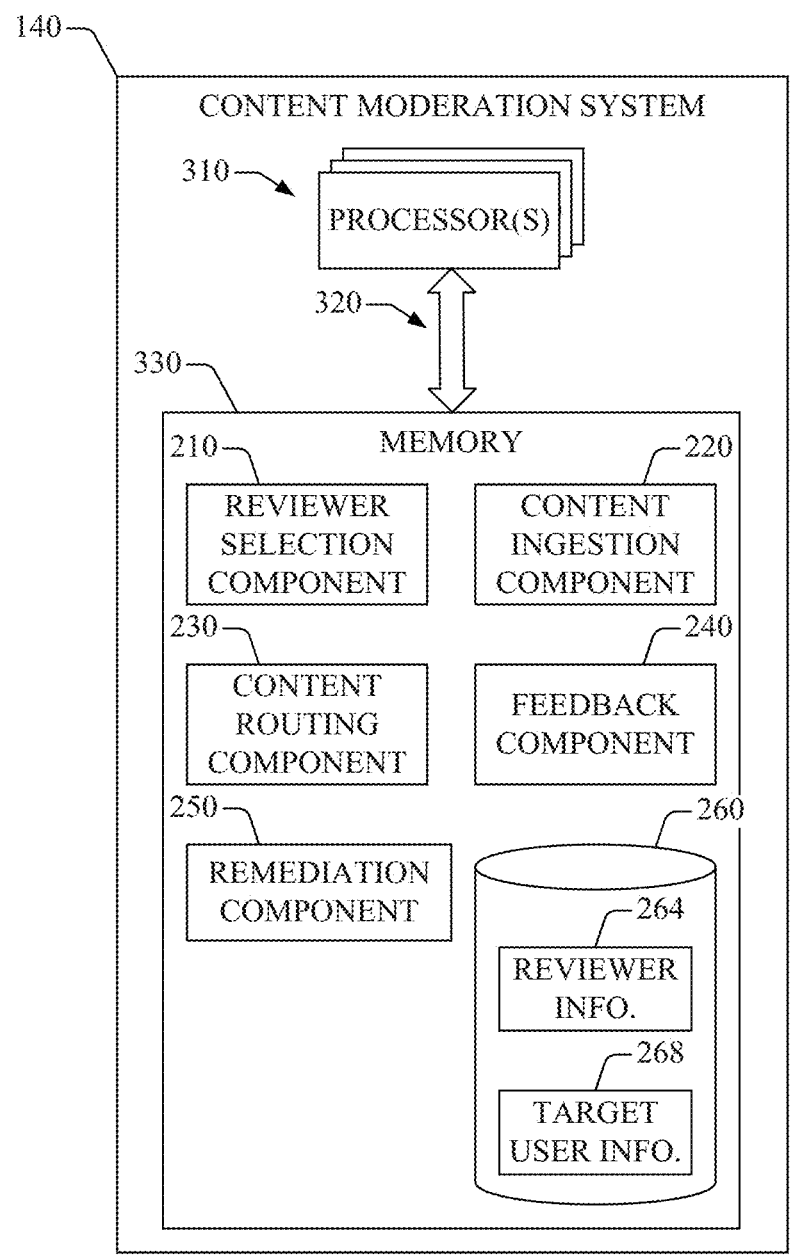
FIG. 3 presents an example, non-limiting embodiment of another system that can prevent the dissemination of offensive digital content directed to a user account in a social media platform in accordance with one or more embodiments described herein.

FIG. 3 presents a block diagram of an example of the content moderation system 140 in accordance with one or more embodiments described herein. The illustrated content moderation system 140 can include one or more processors 310 and one or more memory devices 330 (referred to as memory 330). In some embodiments, the processor(s) 310 can be arranged in a single computing apparatus (a blade server device or another type of server device, for example). In other embodiments, the processor(s) 310 can be distributed across two or more computing apparatuses (e.g., multiple blade server devices or other types of server devices).

The one or more processors 310 can be operatively coupled to the memory 330 by means of one or more communication interfaces 320, for example. The communication interface(s) 320 can be suitable for the particular arrangement (localized or distributed) of the processor(s) 310. In some embodiments, the communication structure(s) 320 can include one or more of bus architectures, such an Ethernet-based industrial bus, a controller area network (CAN) bus, a Modbus, other types of fieldbus architectures, or the like. In addition, or in other embodiments, the communication interface(s) can include a wireless network and/or a wireline network having respective footprints.

As is illustrated in FIG. 3, the memory device 330 can retain or otherwise store therein machine-accessible components (e.g., computer-readable and/or computer-executable components) in accordance with this disclosure. As such, in some embodiments, machine-accessible instructions (e.g., computer-readable and/or computer-executable instructions) embody or otherwise constitute each one of the machine-accessible components within the memory 330.

The machine-accessible instructions are encoded in the memory 330 and can be arranged to form each one of the machine-accessible components. The machine-accessible instructions can be built (e.g., linked and compiled) and retained in computer-executable form in the memory 330 (as is shown in FIG. 3) or in one or more other machine-accessible non-transitory storage media. Specifically, as is shown in FIG. 3, in some embodiments, the machine-accessible components include the reviewer selection component 210, the content ingestion component 230, the content routing component 240, the feedback component 250, and the remediation component 260.

The machine-accessible components, individually or in combination, can be accessed and executed by at least one of the processor(s) 310. In response to execution, each one of the machine-accessible components can provide the functionality described herein. Accordingly, execution of the computer-accessible components retained in the memory 330 can cause the content moderation system 140 to operate in accordance with aspects described herein. More concretely, at least one of the processor(s) 310 can execute the machine-accessible components to cause the content moderation system 140 to prevent and/or reduce the dissemination of undesirable content directed to a user account in a social media platform, in accordance with aspects of this disclosure.

It is noted that, while not illustrated in FIG. 3, the content moderation system 140 also can include other types of computing resources (e.g., CPUs, memory, disk space, incoming bandwidth, and/or outgoing bandwidth, interface (s) (such as I/O interfaces); controller devices(s); power supplies; and the like) that can permit or otherwise facilitate the execution of the machine-accessible components retained in the memory 330. To that point, for instance, the memory 330 also can include programming interface(s) (such as application programming interfaces (APIs)); an operating system; software for configuration and or control of a virtualized environment; firmware; and the like.

As mentioned, reliance on reviewer accounts selected in accordance with aspects described herein can provide meaningful detection of undesirable content directed to a particular user account within a social media platform. Indeed, in view of the trustworthiness of the reviewer accounts, a reviewer account can detect undesirable content with greater fidelity (e.g., more accurately and/or more reliably) than conventional approaches to eradication of offensive content in social media platforms. The embodiments are not limited to relying on reviewer accounts to evaluate presence of undesirable within digital content directed to the particular user account. In some embodiments, the disclosure can autonomously determine presence of undesirable content contained in digital content directed to the particular user account within the social media platform.

Figure 4:
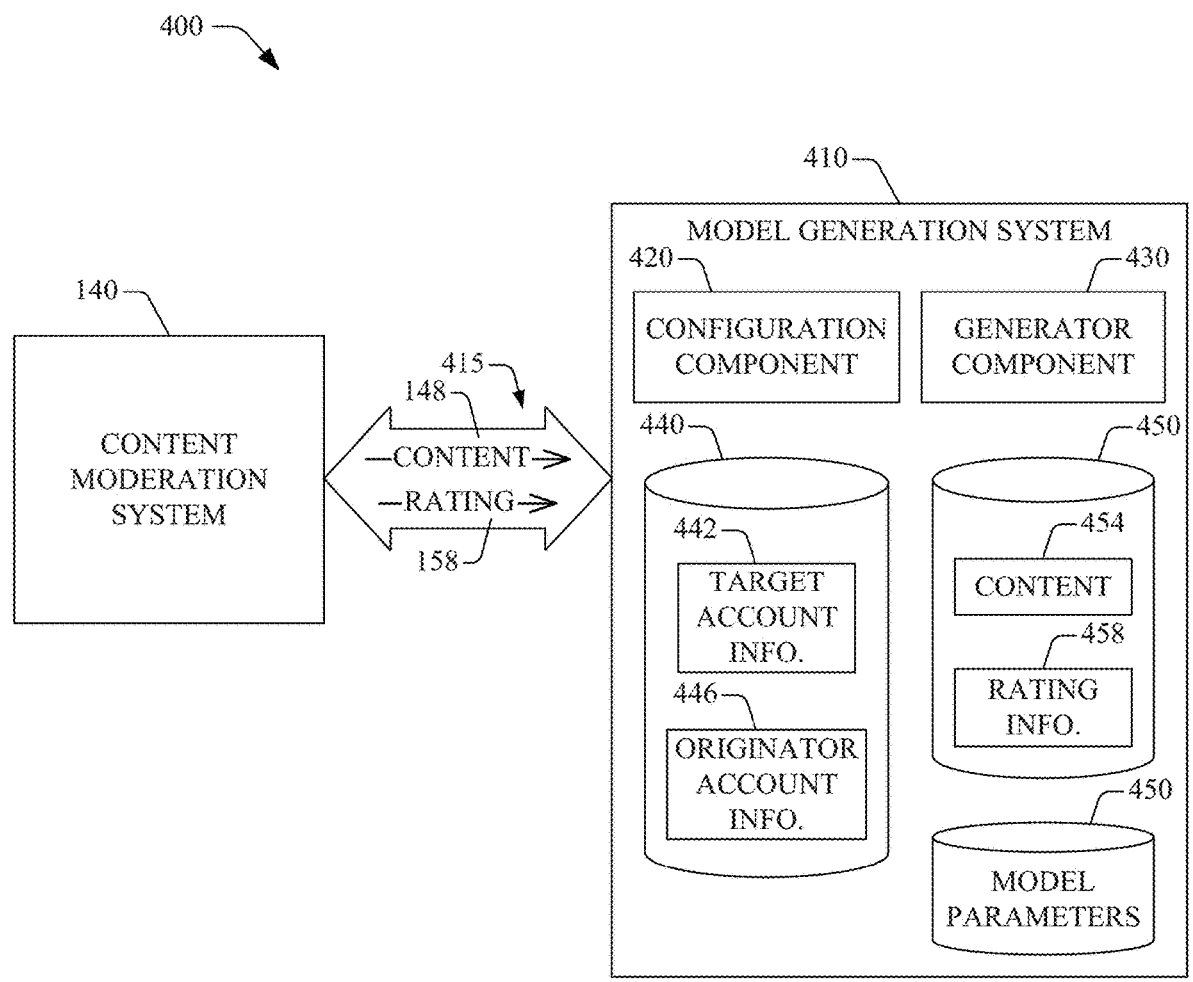
FIG. 4 presents an example, non-limiting embodiment of another system that can prevent the dissemination of offensive digital content in a social media platform in accordance with one or more embodiments described herein.

As an illustration, FIG. 4 presents an example, non-limiting embodiment of a system 400 that can prevent and/or reduce the dissemination of offensive digital content in a social media platform in accordance with one or more embodiments described herein. The illustrated system 400 can include a model generation system 410 than can generate a model to classify or otherwise rate digital content as at least one of offensive content or non-offensive content. As mentioned, other types of classification beyond binary classification can be implemented in some embodiments.

The model generation system 410 can be operatively coupled to the content moderation system 140 via one or more network interfaces 415. In some embodiments, the network interface(s) 415 can be embodied in or can include several types of network elements, including base station devices; router devices; switch devices; server devices; aggregator devices; bus architectures; a combination of the foregoing; or the like. The model generation system 410 can receive digital content 148 directed to a user account within the social media platform. The model generation system 410 also can receive rating information 154 generated by a group of reviewer accounts. As mentioned, the rating information 154 can classify or otherwise rate portions of the digital content 148 as at least one of offensive content or non-offensive content. As is illustrated in FIG. 4, the model generation system 410 can include a configuration component 420 that can retain the digital content 148 and the rating 158 within one or more memory devices 450. The digital content 148 can be retained in one or more memory elements 454 (referred to as content 454) and the rating information 154 can be retained within one or more memory elements 458 (referred to as rating information 458). The content 454 also can include other digital content directed to other user accounts in the social media platforms. Similarly, the rating information 458 also can include other rating information that classifies or otherwise rates portions of the other digital content.

In one embodiment, the configuration component 420 can generate a group of initial parameters that define the model to classify or otherwise rate digital content as at least one of offensive content or non-offensive content. Such a model can be embodied in or can include a machine-learning based model, such as a regression model, a support vector machine (SVM) model, a deep neural network model, or the like. The configuration component 420 also can generate a group of second parameters (e.g., learning rate, mini-batch size, convergence parameters, and the like) that can configure a technique for training or otherwise determining the model. The configuration component 420 can retain the group of parameters and the group of second parameters within one or more memory elements 450 (referred to as model parameters 450).

The model generation system 410 can include a generator component 430 that can determine (or, in machine-learning parlance, can train) the machine-learning model based at least on one or more of the rating information 458 and the digital content 454. To that end, in some embodiments, the generator component 430 can determine or otherwise configure the multiple parameters that define the machine-learning model by solving an optimization problem with respect to an objective function defined at least in part by the multiple parameters. The model can autonomously or automatically evaluate presence of undesirable content within digital content directed to a defined user account.

In some embodiments, the model generation system 410 can generate another model based at least on the content 454 (including the content 148), the rating information 458 (including the rating 158) and metadata corresponding to the user account to which the digital content 148 is directed to, and/or another user account that generates the digital content 148. To that end, the configuration component 420 can receive or otherwise access first metadata corresponding to the user account. The configuration component 420 can retain the first metadata within one or more memory devices 440, in one or more memory elements 442 (referred to as target account information 442). The configuration component 420 also can receive or otherwise access second metadata corresponding to the other user account that originates the digital content 148. The configuration component 420 can retain the second metadata within the memory device(s) 440, in one or more memory elements 446 (referred to as originator account information 442). Each one of the first metadata and the second metadata can include, for example, location information, demographics information, employment information, a combination of the foregoing, or the like.

The generator component 430 can determine another machine-learning model based at least on the content 454, the rating information 458, the metadata, and the second metadata. Again, generator component 430 can determine or otherwise configure multiple parameters that define such a machine-learning model by solving an optimization problem with respect to an objective function defined at least in part by the multiple parameters. The machine-learning model can autonomously or automatically evaluate presence of undesirable content within digital content directed to a defined user account.

The feedback component 250 that can be included in the content moderation system 140 (see FIG. 2) in the example system 400 can utilize or otherwise leverage output of a machine-learning model generated by the model generation system 410 in order to manipulate digital content directed to a particular user account in a social media platform. Accordingly, in some embodiments, the content moderation system 140 can autonomously or automatically prevent and/or reduce the dissemination of undesirable content to the particular user account.

Figure 5:
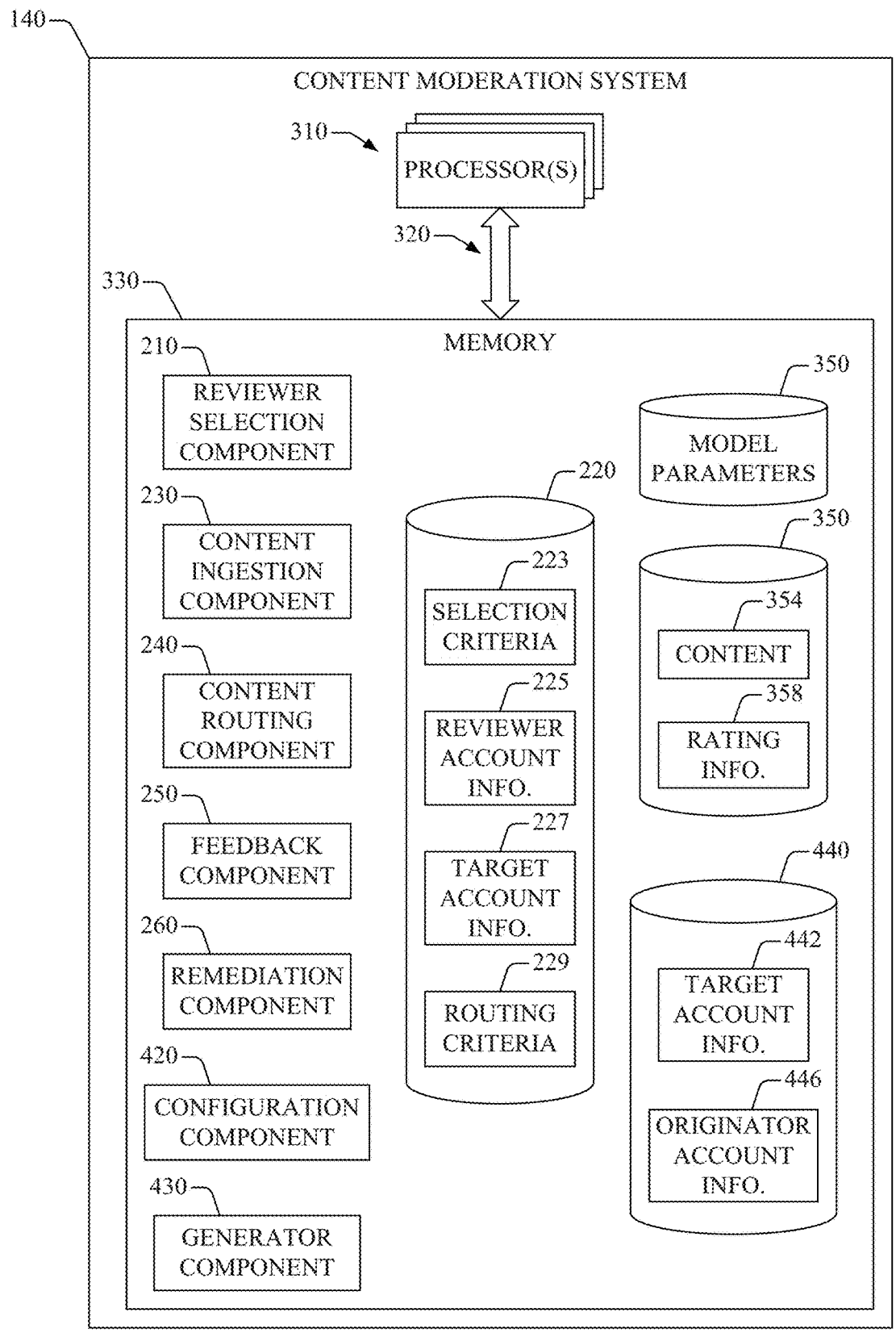
FIG. 5 presents an example, non-limiting embodiment of another system that can prevent the dissemination of offensive digital content directed to a user account in a social media platform in accordance with one or more embodiments described herein.

FIG. 5 presents a block diagram of another example of the content moderation system 140 in accordance with one or more embodiments described herein. The content moderation system 140 illustrated in FIG. 5 can include the one or more processors 310, the one or more communication interfaces 320, and the memory 330. The memory 330 can retain or otherwise store therein machine-accessible components (e.g., computer-readable and/or computer-executable components) in accordance with this disclosure. Specifically, in some embodiments, the machine-accessible components include the reviewer selection component 210, the content ingestion component 230, the content routing component 240, the feedback component 250, the remediation component 260, the configuration component 420, and the generator component 430.

Again, similar to other computing systems disclosed herein, the machine-accessible components, individually or in combination, can be accessed and executed by at least one of the processor(s) 310. In response to execution, each one of the machine-accessible components can provide the functionality described herein. Accordingly, execution of the computer-accessible components retained in the memory 330 can cause the content moderation system 140 to operate in accordance with aspects described herein. More concretely, at least one of the processor(s) 310 can execute the machine-accessible components to cause the content moderation system 140 to prevent and/or reduce the dissemination of undesirable content directed to a user account in a social media platform, in accordance with aspects of this disclosure.

As mentioned with reference to other computing systems of this disclosure, the content moderation system 140 shown in FIG. 5 also can include other types of computing resources (e.g., operating systems (O/Ss); CPU(s); GPU(s); memory (virtual and/or physical); disk space, incoming bandwidth, and/or outgoing bandwidth, interface(s) (such as I/O interfaces); controller devices(s); power supplies; and the like) that can permit or otherwise facilitate the execution of the machine-accessible components retained in the memory 330. To that point, for instance, the memory 330 also can include programming interface(s) (such as application programming interfaces (APIs)), an O/S; software for configuration and or control of a virtualized environment; firmware; and the like.

Figure 6:
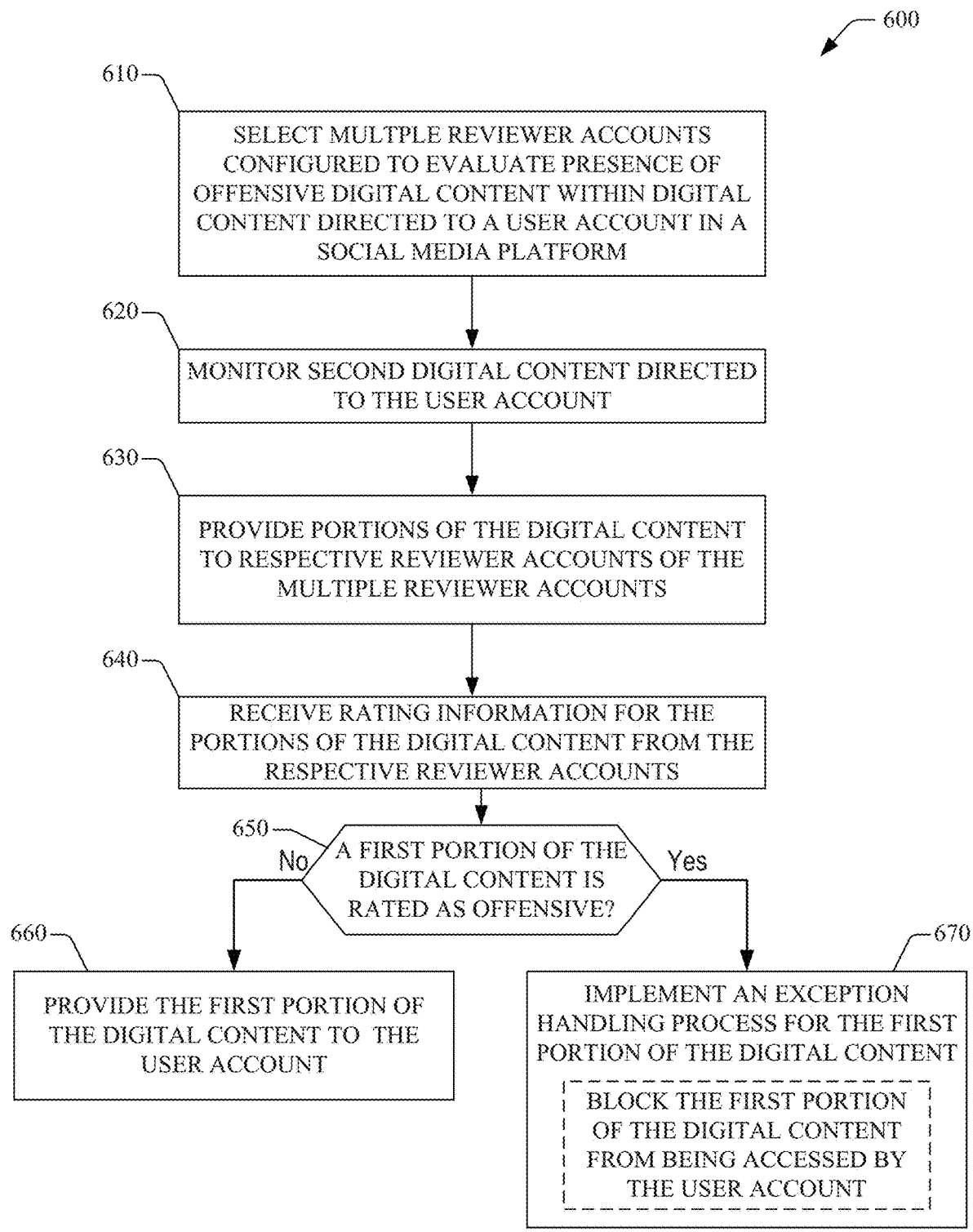
FIG. 6 presents an example, non-limiting embodiment of a computer-implemented method that can prevent the dissemination of offensive digital content in a social media platform in accordance with one or more embodiments described herein.

FIG. 6 illustrates a flowchart of an example of a method 600 for mitigating the dissemination of digital content that can be undesirable to a user account in a social media platform in accordance with one or more embodiments described herein. The example method 600 is not limited to digital content that can be undesirable, and the example method 600 can be applied to other digital content that is undesirable for presentation in the user account. The example method 600 can be implemented, entirely or in part, by a computing system having or being operatively coupled to one or more processors; having or being coupled to one or more memory devices; having or being coupled to other types of computing resources (such as communication interface(s)); a combination thereof; or the like. In some embodiments, the computing system can be embodied in, or can include, the content moderation system 140 in accordance with the various embodiments disclosed herein.

At block 610, the computing system can select (via the reviewer selection component 210, for example) multiple reviewer accounts configured to evaluate presence of offensive digital content within digital content directed to a user account in a social media platform. In one example, the computing system can include or can be operatively coupled to the reviewer selection component 210 that can select the multiple reviewer accounts. In another example, the computing system can execute the reviewer selection component 210 to monitor the second digital content. In some embodiments, the multiple reviewer accounts can be selected in response to an indication of perceived inappropriate conduct directed to the user account. In some embodiments, such an indication can be received by the computing system from a user device (e.g., device 110 in FIG. 1) operatively coupled to the computing system. The indication can be embodied in or can include, for example, the trigger indication 112 in FIG. 1.

In some embodiments, the computing system can select the multiple reviewer accounts by applying one or more selection criteria to an extant pool of reviewer accounts. The one or more selection criteria correspond or are otherwise specific to the user account in the social media platform. As mentioned, in some embodiments, the extant pool of reviewer accounts can be provisioned by a device of the devices 130, for example, in response to provisioning the user account associated with the indication of perceived inappropriate conduct directed to the user account. In other embodiments, the extant pool of reviewer accounts can be generated based on historical information, such as prior explicit selection by the user account. The one or more selection criteria can include, for example, a defined type of relationship (e.g., academic, professional, etc.) to the user account; a defined reviewer rating; presence of a defined type of professional certification; membership in an advocacy group (e.g., volunteer member); a combination thereof; or the like.

As such, in one embodiment, the one or more selection criteria can include a defined performance criterion to correctly identify offensive content, and the computing system can select each a reviewer account that satisfies such a criterion. In addition, or in another embodiment, the one or more selection criteria can include presence of an established relationship to the user account, such as a first-degree connection on the social media platform. Thus, the computing system can identify a reviewer account having an extant relationship with the user account in the social media platform. Further, or yet another embodiment, the one or more selection criteria can include membership in a group of volunteers to review digital content that can be present in a situation corresponding to a defined type of offensive conduct.

At block 620, the computing system can monitor second digital content directed to the user account. In one example, the computing system can include or can be operatively coupled to the content ingestion component 230 that can monitor such second digital content. In another example, the computing system can execute the content ingestion component 230 to monitor the second digital content. The second digital content can be monitored before presentation by a user device that is configured to consume content from the user account or is otherwise associated with the user account. As mentioned, the digital content can be monitored according to numerous approaches. For instance, the computing system can cause or otherwise direct an agent component in the social media platform to collect the second digital content at the social media platform and send the second digital content to the computing system or a network device operatively coupled thereto. Thus, monitoring the second digital content includes receiving the second digital content from a device (e.g., one of the devices 130) operatively coupled to the computing system.

At block 630, the computing system can provide portions of the monitored digital content to respective reviewer accounts of the multiple reviewer accounts. At least one first portion of the portions can be accessed via one or more of the reviewer devices $150_1$-$150_N$. In one example, the computing system can include or can be operatively coupled to the content routing component 240 that can provide the portions of the digital content to the respective reviewer devices. In another example, the computing system can execute the content routing component 240 to such portions of digital content.

In some embodiments, to provide the portions of the digital content to respective reviewer accounts, the computing system can apply (via the content routing component 240, for example) defined routing criteria. Such portions can be retained, for example, in a storage device of the devices 130, for subsequent access by one or more of the reviewer devices $150_1$-$150_N$. In some implementations, the routing criteria can include, for example, a rule that dictates that the monitored digital content be distributed evenly amongst the selected reviewer accounts as is disclosed herein. In addition, or in other implementations, the routing criteria can include another rule that causes the computing system to determine (via the reviewer selection component 210, for example) a satisfactory reviewer account to moderate the monitored digital content. The computing system can then send (via, the content routing component 240, for example) the entirety of the monitored digital content to a user device associated with the satisfactory reviewer account (e.g., one of the reviewer devices $150_1$-$150_N$ shown FIG. 1).

At block 640, the computing system can receive rating information for the portions of the digital content from the respective reviewer accounts. In one example, the computing system can include or can be operatively coupled to the feedback component 250 that can receive such rating information. In another example, the computing system can execute the feedback component 250 to receive such rating information.

At block 650, the computing system can determine if a first portion of the digital content is rated as offensive. In one example, the computing system can include or can be operatively coupled to the feedback component 250 that can determine if a first portion of the digital content is rated as offensive. In another example, the computing system can execute the feedback component 250 to determine if a first portion of the digital content is rated as offensive. In response to a negative determination ("No" branch in FIG. 6), the example method 600 continues to block 660, at which block the computing system can provide (e.g., send or make available) the first portion of the digital content to the user account. Thus, such first portion can be available for presentation (e.g., display and/or playback) at a user device being utilized to access the user account. The computing system can include or can be operatively coupled to the content routing component 240 that can provide the first portion of the digital content for presentation at the user device associated with the user account. In another example, the computing system can execute the content routing component 240 to provide first portion of the digital content for presentation at the user device associated with the user account.

In the alternative, in response to a positive determination at block 650 ("Yes" branch in FIG. 6), the computing system can implement an exception handling process for the first portion of the digital content at block 670. The computing system can include or can be operatively coupled to the remediation component 260 that can implement the exception handling process. In another example, the computing system can execute the remediation component 260 to implement the exception handling process. In some embodiments, implementing the exception handling process can include blocking, by the computing system, the first portion of the digital content from being accessed by, or provided to, the user account. Therefore, in such embodiments, the first portion of the digital content cannot be consumed at a user device being utilized to access the user account.

In other embodiments, the computing system can implement (via the remediation component 260, for example) the exception handling process to resolve the presence of such a first portion of the second digital content in the social media platform. Accordingly, in one example, the computing system can cause or otherwise direct a first reviewer device of a group of reviewer devices (e.g., one or more of reviewer devices $150_1$-$150_N$) to display a visual element that permits or otherwise facilities editing the first portion of the portions of the second digital content. For instance, the editing can include removing offensive terminology or other forms of offensive terminology from the first portion of the portions of the second digital content. The terminology can be removed while maintaining context. Editing the first portion of the portions of second digital content results in moderated content (e.g., moderated content 114) that the computing system can send (via the content routing component 240) to the user device associated with the user account in the social media platform.

Figure 7:
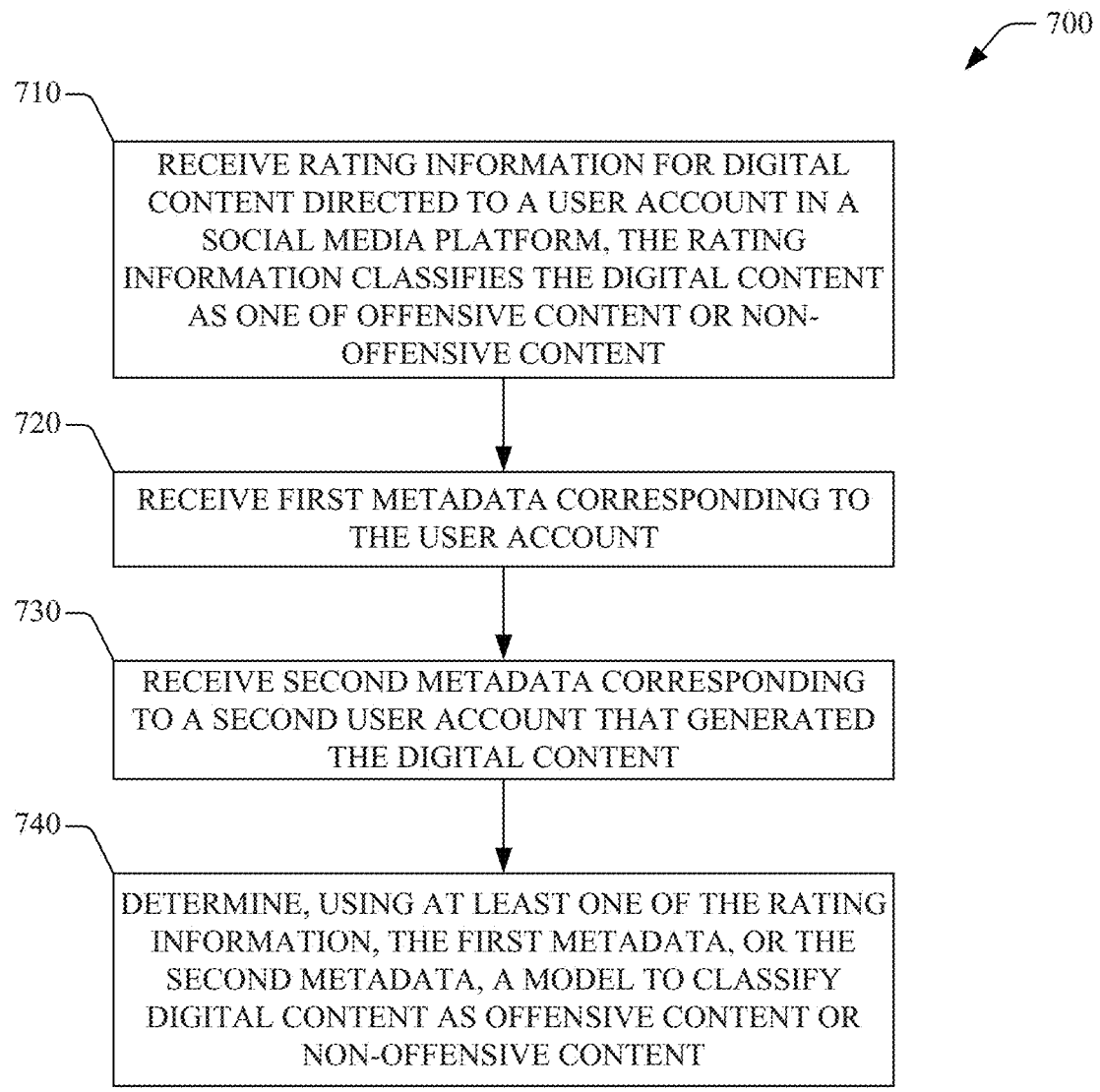
FIG. 7 presents an example, non-limiting embodiment of a computer-implemented method that can generate models to identify digital content that is offensive in a social media platform in accordance with one or more embodiments described herein.

FIG. 7 illustrates a flowchart of an example of a method 700 that can generate models to identify digital content that can be offensive or otherwise undesired in a social media platform in accordance with one or more embodiments described herein. The example method 700 is not limited to digital content that can be offensive or otherwise undesired, and the example method 700 can be applied to other digital content that can be otherwise undesirable for presentation in the user account. The example method 700 can be implemented, entirely or in part, by a computing system having one or more processors; one or more memory devices; other types of computing resources (such as communication interface(s)); a combination thereof; or the like. In some embodiments, the computing system can be embodied in, or can constitute, the content moderation system 140 in accordance with the various embodiments disclosed herein. In one example, the computing system can be embodied in a portion of the content moderation system 140 shown in FIG. 5.

At block 710, the computing system can receive (via the configuration component 420, for example) rating information for digital content directed to a user account in a social media platform. The rating information can classify the digital content as one of the offensive content or non-offensive content. At block 720, the computing system can receive (also via the configuration component 420, for example) first metadata corresponding to the user account. At block 730, the computing system can receive (also via the configuration component 420, for example) second metadata corresponding to a second user account that generated the digital content.

At block 740, the computing system can determine, using at least one of the rating information, the first metadata, or the second metadata, a model to classify digital content as one of offensive content or non-offensive content. The computing system can include or can be operatively coupled to the generator component 430 that can determine the model using at least the rating information, the first metadata, and/or the second metadata. In another example, the computing system can execute the remediation component 260 to implement the exception handling process. In some embodiments, the computing system can determine such a model by applying machine learning techniques, e.g., regression, SVM techniques, neural network techniques, or the like. Accordingly, the computing system can configure multiple parameters that define the model (or, in machine-learning parlance, that train the model) to autonomously classify or otherwise rate the digital content as either offensive or non-offensive. As is disclosed herein, the multiple parameters can be configured, for example, by solving an optimization problem with respect to an objective function defined at least in part by the multiple parameters.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
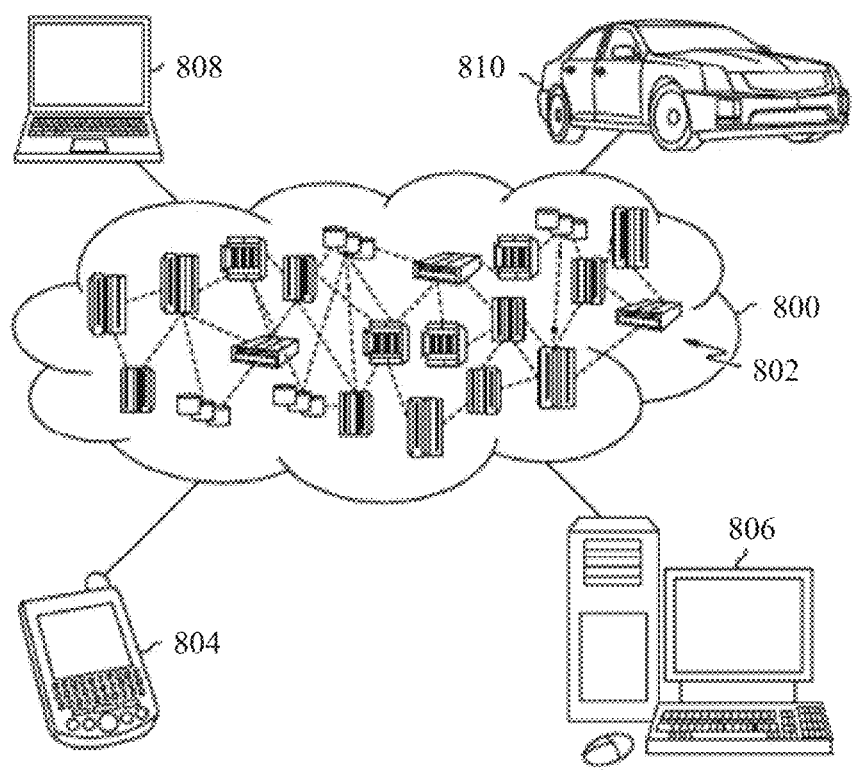
FIG. 8 depicts a cloud computing environment in accordance with one or more embodiments described herein.

Referring now to FIG. 8, illustrative cloud computing environment 800 is depicted. Repetitive description of like elements employed in other embodiments described herein is omitted for sake of brevity. As shown, cloud computing environment 800 includes one or more cloud computing nodes 802 with which local computing devices used by cloud consumers, such as, for example, personal digital assistant (PDA) or cellular telephone 804, desktop computer 806, laptop computer 808, and/or automobile computer system 810 may communicate. Nodes 802 may communicate with one another. They may be grouped (not shown) physically or virtually, in one or more networks, such as Private, Community, Public, or Hybrid clouds as described hereinabove, or a combination thereof. This allows cloud computing environment 800 to offer infrastructure, platforms and/or software as services for which a cloud consumer does not need to maintain resources on a local computing device. It is understood that the types of computing devices 804-810 shown in FIG. 8 are intended to be illustrative only and that computing nodes 802 and cloud computing environment 800 can communicate with any type of computerized device over any type of network and/or network addressable connection (e.g., using a web browser).

Figure 9:
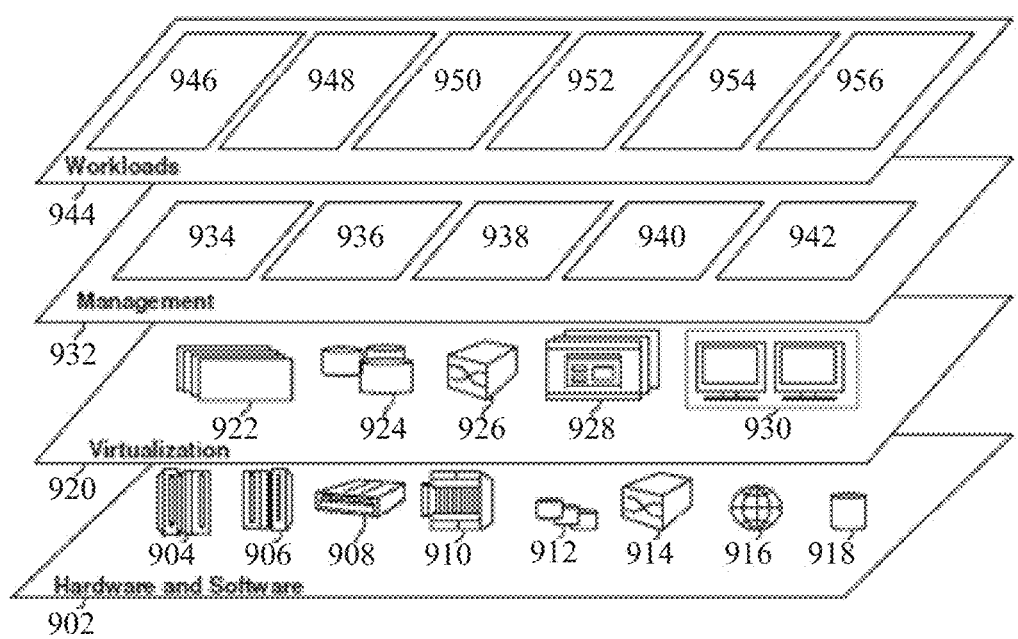
FIG. 9 depicts abstraction model layers in accordance with one or more embodiments described herein.

Referring now to FIG. 9, a set of functional abstraction layers provided by cloud computing environment 800 (FIG. 8) is shown. Repetitive description of like elements employed in other embodiments described herein is omitted for sake of brevity. It should be understood in advance that the components, layers, and functions shown in FIG. 9 are intended to be illustrative only and embodiments of the invention are not limited thereto. As depicted, the following layers and corresponding functions are provided.

Hardware and software layer 902 includes hardware and software components. Examples of hardware components include: mainframes 904; RISC (Reduced Instruction Set Computer) architecture-based servers 906; servers 908; blade servers 910; storage devices 912; and networks and networking components 914. In some embodiments, software components include network application server software 916 and database software 918.

Virtualization layer 920 provides an abstraction layer from which the following examples of virtual entities may be provided: virtual servers 922; virtual storage 924; virtual networks 926, including virtual private networks; virtual applications and operating systems 928; and virtual clients 930.

In one example, management layer 932 may provide the functions described below. Resource provisioning 934 provides dynamic procurement of computing resources and other resources that are utilized to perform tasks within the cloud computing environment. Metering and Pricing 936 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 938 provides access to the cloud computing environment for consumers and system administrators. Service level management 940 provides cloud computing resource allocation and management such that required service levels are met. Service Level Agreement (SLA) planning and fulfillment 942 provide pre-arrangement for, and procurement of, cloud computing resources for which a future requirement is anticipated in accordance with an SLA.

Workloads layer 944 provides examples of functionality for which the cloud computing environment may be utilized. Examples of workloads and functions which may be provided from this layer include: mapping and navigation 946; software development and lifecycle management 948; virtual classroom education delivery 950; data analytics processing 952; transaction processing 954; and offensive content management 956. Various embodiments of the present disclosure can utilize the cloud computing environment described with reference to FIGS. 8 and 9 to provide crowdsourcing approaches for the prevention and/or reduction of the dissemination of undesirable digital content to user accounts in a social media platform.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
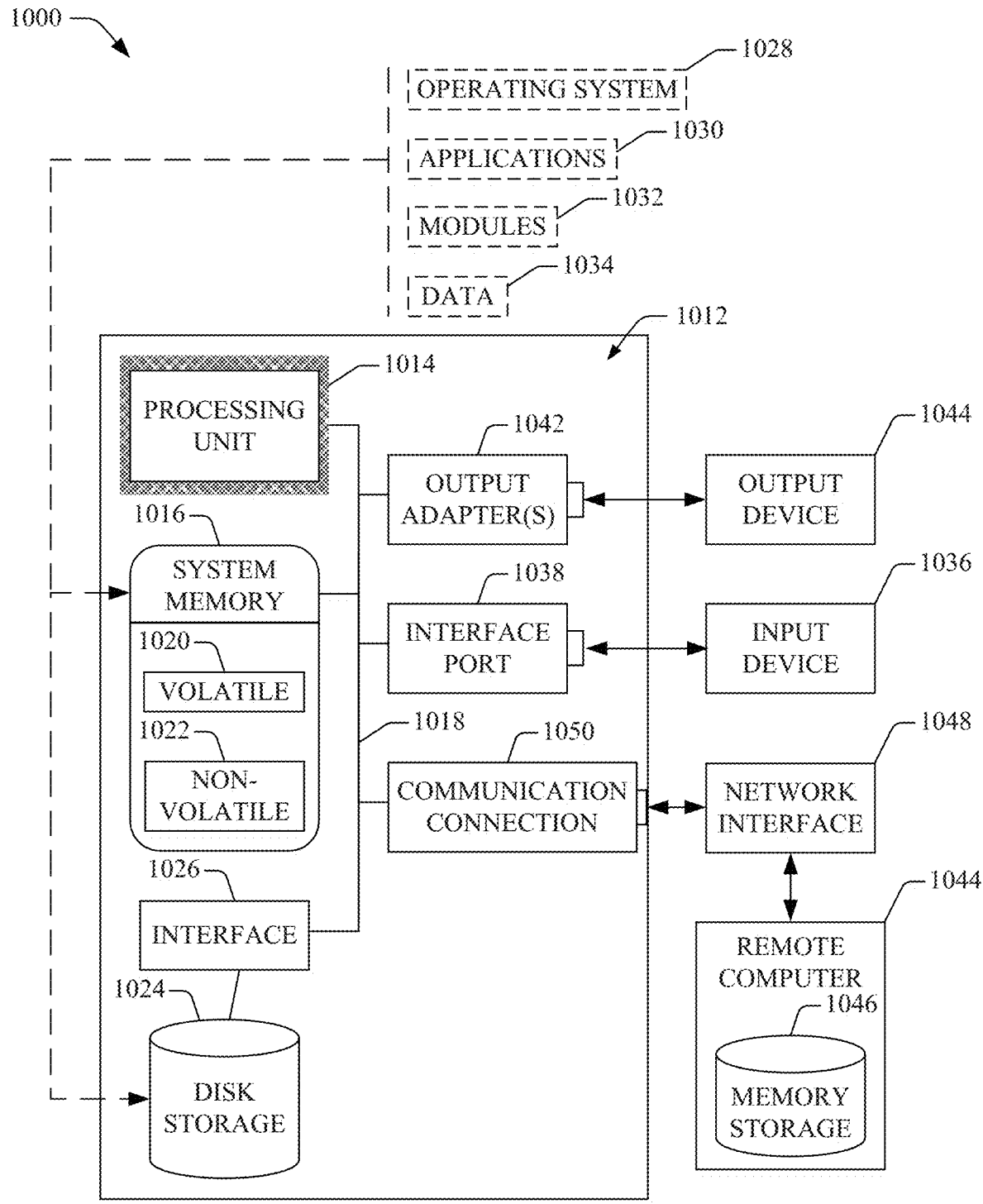
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity. With reference to FIG. 10, a suitable operating environment 1000 for implementing various aspects of this disclosure can include a computer 1012. The computer 1012 can also include a processing unit 1014, a system memory 1016, and a system bus 1018. The system bus 1018 can operably couple system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, can be stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface can be used, such as interface 1026. FIG. 10 also depicts software that can act as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 can take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through one or more input devices 1036. Input devices 1036 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1014 through the system bus 1018 via one or more interface ports 1038. The one or more Interface ports 1038 can include, for example, a serial port, a parallel port, a game port, and a universal serial bus (USB). One or more output devices 1040 can use some of the same type of ports as input device 1036. Thus, for example, a USB port can be used to provide input to computer 1012, and to output information from computer 1012 to an output device 1040. Output adapter 1042 can be provided to illustrate that there are some output devices 1040 like monitors, speakers, and printers, among other output devices 1040, which require special adapters. The output adapters 1042 can include, by way of illustration and not limitation, video and sound cards that provide a means of connection between the output device 1040 and the system bus 1018. It should be noted that other devices and/or systems of devices provide both input and output capabilities such as one or more remote computers 1044.

Computer 1012 can operate in a networked environment using logical connections to one or more remote computers, such as remote computer 1044. The remote computer 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer 1044. Remote computer 1044 can be logically connected to computer 1012 through a network interface 1048 and then physically connected via communication connection 1050. Further, operation can be distributed across multiple (local and remote) systems. Network interface 1048 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units.

In this disclosure, terms such as "store," "storage," "data store," "data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A system, comprising:
   a memory that stores computer-executable components; and
   a processor, operatively coupled to the memory, that executes the computer-executable components, the computer-executable components comprising:
   a selection component that identifies multiple reviewer accounts based at least on one or more selection criteria corresponding to a first user account in a social media platform, wherein the multiple reviewer accounts are selected to evaluate presence of offensive digital content in the social media platform directed to the first user account, and the one or more selection criteria comprises at least one of reviewer account of the multiple reviewer accounts has membership in an advocacy group associated with a defined type of offensive conduct;
   a content routing component that provides portions of digital content directed to the first user account to respective reviewer accounts of the multiple reviewer accounts;
   a feedback component that receives, from the respective reviewer accounts, rating information indicative of ratings for the portions of the digital content, wherein a first rating of the ratings classifies a first portion of the portions of the digital content as one of offensive content or non-offensive content; and
   a remediation component that, in response to a determination that the first portion is classified as offensive content, implements an exception handling process to resolve a presence of the offensive content in the social media platform, wherein the exception handling process sends customized sensitivity training content to a second user account that originated the first portion of the digital content, and wherein customized sensitivity training content comprises an edited version of the first portion of the digital content that would be classified as non-offensive content.

2. The system of claim 1, wherein the content routing component provides the portions of the digital content using at least one routing criterion to allocate the portions to the respective reviewer accounts.

3. The system of claim 1, wherein the exception handling process further renders unavailable the first portion of the portions of the digital content to the first user account.

4. The system of claim 1, wherein the exception handling process further directs a user device associated with a first reviewer account of the respective reviewer accounts to display a selectable visual element that permits editing the first portion of the portions of the digital content.

5. The system of claim 4, wherein the editing comprises removing offensive terminology from the first portion of the portions of the digital content while maintaining context.

6. The system of claim 1, wherein the exception handling process further sends a notification message to an administrator account of the social media platform, the notification message identifies the second user account that originated the first portion of the portions of the digital content.

7. The system of claim 1, wherein the feedback component:
    determines that the first portion of the portions of the digital content is classified as the non-offensive content; and
    provides the first portion of the portions of the digital content to a user device associated with the first user account, wherein the user device presents the first portion.

8. The system of claim 1, wherein the one or more selection criteria further comprises a defined type of professional certification.

9. The system of claim 1, wherein the selection component identifies a reviewer account having an extant relationship with the user account of the social media platform.

10. The system of claim 1, wherein the defined type of offensive conduct is selected from a group of types consisting of school bullying, workplace hostility, domestic altercation, and political altercation.

11. The system of claim 1, wherein the computer-executable components further comprise:
    a configuration component that:
        receives first metadata corresponding to the second user account that originated a second portion of the portions of the digital content that is classified as the offensive content; and
        receives second metadata corresponding to the first user account in the social media platform; and
    a model generator component that generates a model for identifying the offensive content using machine-learning based at least on one or more of the rating information, the first metadata, or the second metadata, wherein the model classifies the digital content directed to the first user account as one of the offensive content or the non-offensive content.

12. A computer-implemented method, comprising:
    selecting, by a system operatively coupled to a processor, multiple reviewer accounts based at least on one or more selection criteria corresponding to a first user account in a social media platform, wherein the multiple reviewer accounts are selected to evaluate presence of offensive digital content in the social media platform directed to the user first account, and the one or more selection criteria comprises the at least one of reviewer account of the multiple reviewer accounts has membership in an advocacy group associated with a defined type of offensive conduct;
    providing, by the system, portions of digital content directed to the first user account to respective reviewer accounts of the multiple reviewer accounts;
    receiving, by the system, from the respective reviewer accounts, rating information indicative of ratings for the portions of the digital content, wherein a first rating of the ratings classifies a first portion of the portions of the digital content as one of offensive content or non-offensive content; and
    in response to determining that the first portion is classified as offensive content, implementing, by the system, an exception handling process to resolve a presence of the offensive content in the social media platform, wherein the exception handling process sends customized sensitivity training content to a second user account that originated the first portion of the digital content, and wherein customized sensitivity training content comprises an edited version of the first portion of the digital content that would be classified as non-offensive content.

13. The computer-implemented method of claim 12, wherein the exception handling process further causes a user device associated with a first reviewer account of the respective reviewer accounts to display a visual element that permits editing the first portion of the portions of the digital content, content remove offensive terminology and maintain context.

14. The computer-implemented method of claim 12, further comprising:
    determining, by the system, that the first portion of the portions of the digital content is classified as the non-offensive content; and
    causing, by the system, a user device associated with the first user account to display the first portion of the portions of the digital content.

15. The computer-implemented method of claim 12, wherein the one or more selection criteria further comprises a defined type of professional certification.

16. A computer program product for providing a crowd-sourced solution to remove offensive digital content from a social media user account, the computer program product comprising a computer readable storage medium having program instructions embodied therewith, the program instructions executable by a processor to cause the processor to:
    select, by the processor, multiple reviewer accounts based at least on one or more selection criteria corresponding to a first user account in a social media platform, wherein the multiple reviewer accounts are selected to evaluate presence of the offensive digital content in the social media platform directed to the first user account, and the one or more selection criteria comprises the at least one of reviewer account of the multiple reviewer accounts has membership in an advocacy group associated with a defined type of offensive conduct;
    provide, by the processor, portions of digital content directed to the first user account to respective reviewer accounts of the multiple reviewer accounts;
    receive, by the processor, from the respective reviewer accounts, rating information indicative of ratings for the portions of the digital content, wherein a first rating of the ratings classifies a first portion of the portions of the digital content as one of offensive content or non-offensive content; and
    in response to a determination that the first portion is classified as offensive content, implement, by the processor, an exception handling process to resolve a presence of the offensive content in the social media platform, wherein the exception handling process sends customized sensitivity training content to a second user account that originated the first portion of the digital content, and wherein customized sensitivity training content comprises an edited version of the first portion of the digital content that would be classified as non-offensive content.

17. The computer program product of claim 16, wherein the exception handling process further causes a user device associated with a first reviewer account of the respective reviewer accounts to display a visual element that permits editing the first portion of the portions of the digital content.

18. The computer program product of claim 16, the program instructions are further executable by the processor to cause the processor to:
   determine, by the processor, that the first portion of the portions of the digital content is classified as the non-offensive content; and
   direct, by the processor, a user device associated with the first user account to display the first portion of the portions of the digital content.

19. The computer program product of claim 16, wherein the one or more selection criteria further comprises a defined type of professional certification.

20. The computer program product of claim 16, wherein the defined type of offensive conduct is selected from a group of types consisting of school bullying, workplace hostility, domestic altercation, and political altercation.

* * * * *